May 23, 1933.    M. G. KLEMME    1,910,255
COOKING STOVE
Filed Feb. 3, 1932    2 Sheets-Sheet 1

INVENTOR:
Maurice G. Klemme
by Count Count Groenly
HIS ATTORNEYS

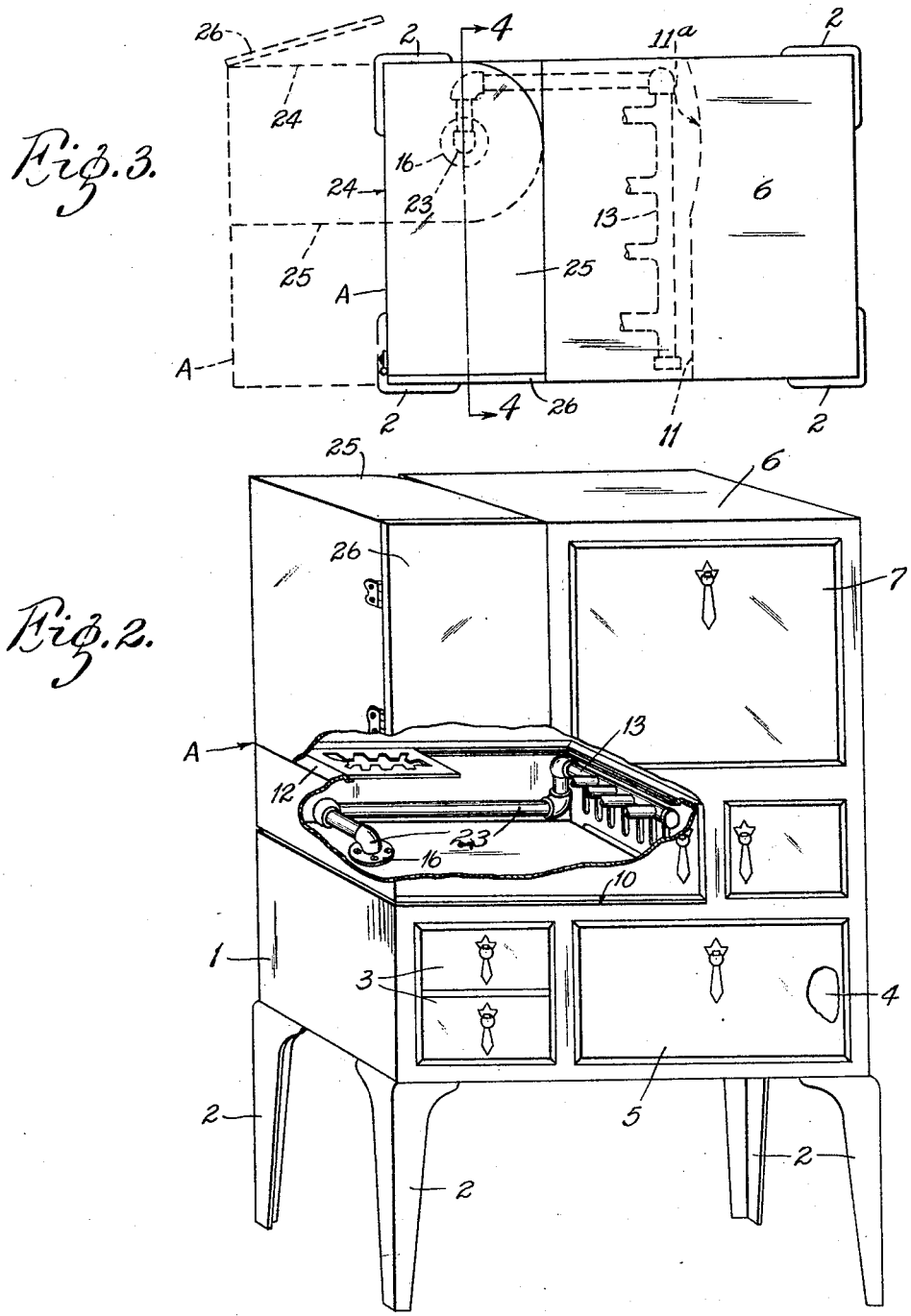

Patented May 23, 1933

1,910,255

UNITED STATES PATENT OFFICE

MAURICE G. KLEMME, OF BELLEVILLE, ILLINOIS, ASSIGNOR TO EAGLE FOUNDRY COMPANY, OF BELLEVILLE, ILLINOIS, A CORPORATION OF ILLINOIS

COOKING STOVE

Application filed February 3, 1932. Serial No. 590,526.

My invention relates to cooking stoves, particularly gas stoves of the cabinet type having an oven at the top and broiler and utensil compartments at the bottom. The object of my invention is to provide a cooking stove of the cabinet type with a pivoted burner supporting member which, when not in use, constitutes a portion of the stove cabinet or casing. Other objects are to provide for simplicity and cheapness of construction and compactness and neatness of design. The invention consists in the cabinet cooking stove and in the construction, combinations, and arrangements of parts hereinafter described and claimed.

Figure 1:
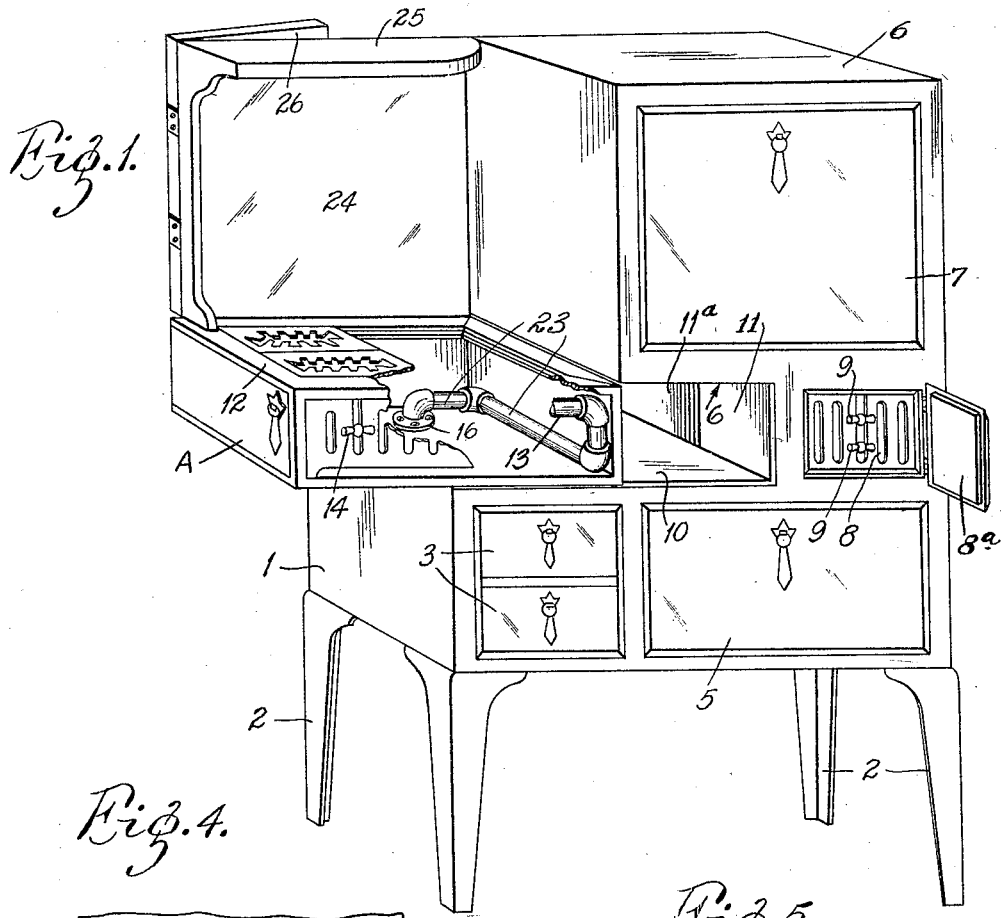
Figure 4:
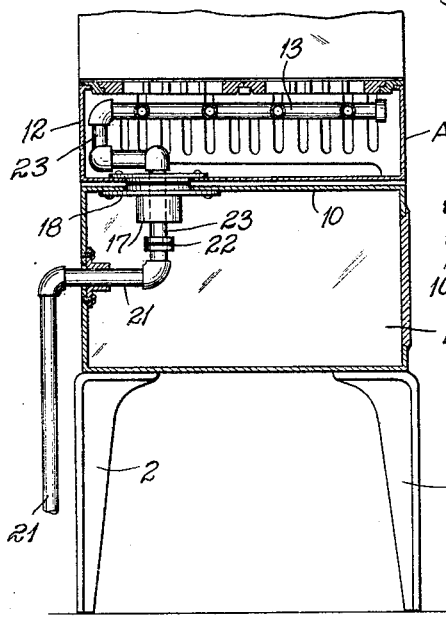
Figure 5:
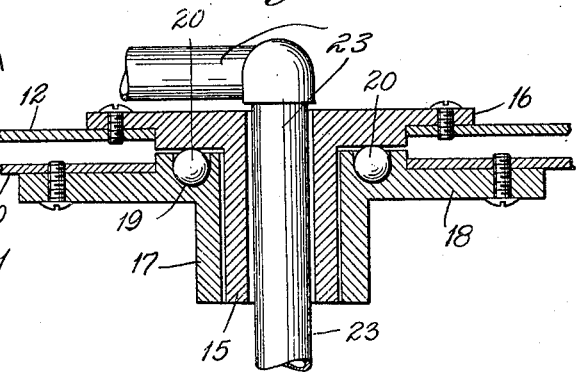

In the accompanying drawings, which form part of this specification and wherein like symbols refer to like parts wherever they occur, Fig. 1 is a front perspective view of a cabinet stove embodying my invention, the burner tray being shown in cooking position with parts thereof broken away to disclose the supply pipe and manifold for the burners, Fig. 2 is a similar perspective view of said stove, the cabinet being shown closed and the burner tray being shown partly broken away, Fig. 3 is a plan view of the stove, Fig. 4 is a vertical section on the line 4—4 in Fig. 3; and Fig. 5 is an enlarged fragmentary vertical section through the bearing for supporting the burner tray.

Referring to the accompanying drawings, my invention is shown in connection with a gas stove of the cabinet type. Said stove comprises a lower portion 1 supported on legs 2 and provided with utensil drawers 3 and a broiler compartment 4 closed by a door 5, said stove also comprises an oven 6, which is closed by a door 7 and is located at one end of the stove above the broiler compartment. Said end of said stove is also provided with a compartment 8 that is located between the oven 6 and the broiler compartment 4. This last mentioned compartment contains the usual heating members or burners (not shown) for supplying heat to the oven 6 and to the broiler compartment 4; and it also contains the cocks 9 for controlling the flow of gas to the burners for said oven and said broiler compartment, said burner compartment being provided with a door 8a for concealing said cocks.

As shown in the drawings, the lower portion 1 of the stove is provided with a flat top 10 that extends from the burner compartment 8 at one end of the stove to the opposite end thereof. The oven 6 is wider than the burner compartment located therebelow, whereby a portion of said oven overhangs a portion of the top 10 of the lower portion 1 of said stove and is spaced vertically therefrom to provide a recess 11 adapted to accommodate a portion of a rectangular burner supporting member A that is mounted for horizontal swinging movement over the top 10 of the lower portion of said stove.

The burner supporting member comprises a burner tray 12 which is provided with the usual grids and the usual burners (not shown) that are supplied with gas through a manifold 13. Suitable cocks or valves 14 are provided for controlling the flow of the gas to the burners.

The pivotal connection between the burner tray 12 and the top 10 of the lower portion 1 of the stove comprises a vertically disposed sleeve 15 having a flange 16 at its upper end that is rigidly secured to the bottom of said burner tray. The sleeve 15 extends downwardly into a vertically disposed sleeve 17 mounted in an opening provided therefor in the top 10 of the lower portion 1 of the stove and provided at its top with a flange 18 that is rigidly secured to said top. The flange 18 of the sleeve 17 is provided with a circular raceway 19 having a series of balls 20 therein that support the flange 16 at the upper end of the sleeve 15 that is fixed to the burner tray 12. By this arrangement the burner tray 12 is supported on the balls 20 for horizontal swinging movement across the flat top portion 10 of the lower portion 1 of the stove.

A gas supply pipe comprises a section 21, which enters the lower portion of the stove through a hole in the rear wall therefrom and has a suitable gas tight swivel joint connection 22 with the lower end of a section 23 that extends upwardly through the sleeve 15 fixed to the bottom of the burner tray 12 and is connected to the intake manifold 13 carried by said burner tray. The swivel joint connection 23 between the stationary section 22 of the supply pipe and the movable section 23 thereof insures a flow of gas to the burners in all positions of the horizontal swinging movement of the burner tray 12.

The rectangular burner tray 12 is of a size and shape corresponding to the size and shape of the rectangular top 10 of the lower portion 1 of the stove; and, as shown in Fig. 3, the location of the pivot about which said burner tray swings is such that, in the closed or inoperative position of said tray, a portion of the tray swings into the recess 11 beneath the overhanging portion of the oven with its exposed sides flush with the adjacent vertical faces of the lower portion of the stove. As shown in Fig. 3, the rear portion of the vertical wall of the recess 11 is curved inwardly, as at 11a, to permit the rear inner cover of the burner tray to clear said wall. When it is desired to move the burner tray 12 to cooking position, the tray is swung rearwardly through an angle of ninety degrees to bring the side of the tray having the gas cocks 14 thereon flush with the front face of the stove, the location of the pivot about which the burner tray turns being such as to cause the entire tray to swing clear of the oven.

The side of the tray located opposite the side through which the gas cocks 14 project is provided with an upstanding wall 24, which terminates at its upper end in a horizontally disposed portion 25 that overhangs a portion of the burner tray. In the cooking position of the tray, the wall 24 and the overhanging portion 25 at the top thereof are located at the rear of the stove and form a splasher back for the tray. In the closed or inoperative position of the tray, the wall 24 is disposed flush with the end wall of the stove and forms a continuation thereof, and the overhanging portion 25 at the top of said wall is disposed flush with the top of the oven and forms a continuation thereof. The wall 24 is also provided along one vertical edge with a hinged section 26 which, in the closed or inoperative position of the burner tray, forms a portion of the front wall of the stove, and which, in the open or cooking position of said tray, is folded back upon the rear side of the wall.

The hereinbefore described cabinet cooking stove has numerous advantages. It is of simple, cheap and compact construction; it permits the burner tray to be quickly and easily swung into and out of cooking position and it provides a completely closed cabinet which completely encloses or conceals the cooking top when not in use.

Obviously, the hereinbefore described construction admits of considerable modification without departing from the invention. Therefore, I do not wish to be limited to the precise arrangement shown and described.

What I claim is:

1. A cabinet stove comprising a stationary main body portion provided at one end with an upright oven, and a burner tray mounted on the opposite end of said body portion alongside of said oven for horizontal swinging movement into and out of cooking position, said burner tray having portions adapted in the inoperative position of said tray to cooperate with the oven and main body portion of said stove to form a completely enclosed cabinet.

2. A cabinet stove comprising a stationary main body portion provided at one end with an upright oven, and a burner tray mounted on said body portion alongside of said oven for horizontal swinging movement into and out of cooking position, said burner tray having portions adapted in the inoperative position of said tray to cooperate with the oven and main body portion of said stove to form a completely enclosed cabinet, one of said portions being adapted to form a splasher back for said tray in the cooking position thereof and a portion of the end wall and top of said cabinet in the inoperative position of said tray, the remaining portion comprising a section hinged to said first mentioned portion and adapted in the inoperative position of said tray to form a portion of the front wall of said cabinet.

3. A cabinet gas stove comprising a stationary main body portion provided at one end with an upright oven, and a burner tray pivotally connected to said body portion alongside of said oven for horizontal swinging movement into and out of cooking position, said burner tray having portions adapted in the inoperative position of said tray to cooperate with the oven and main body portion of said stove to form a completely enclosed cabinet, the pivotal connection between said tray and said stationary main body portion of said stove comprising a cylindrical sleeve fixed to said stove, and a cylindrical sleeve fixed to said burner tray and supported on and extending into said first mentioned sleeve.

4. A cabinet gas stove comprising a stationary main body portion provided at one end with an upright oven, and a burner tray pivotally connected to said body portion alongside of said oven for horizontal swinging movement into and out of cooking position, said burner tray having portions adapted in the inoperative position of said tray to cooperate with the oven and main body portion of said stove to form a completely enclosed cabinet, the pivotal connection between said tray and said stationary main body portion of said stove comprising a cylindrical sleeve fixed to said stove, a cylindrical sleeve fixed to said burner tray and supported on and extending into said first mentioned sleeve, and antifriction members interposed between said sleeve.

5. A cabinet gas stove comprising a stationary main body portion provided at one end with an upright oven, and a burner tray pivotally connected to said body portion alongside of said oven for horizontal swinging movement into and out of cooking position, said burner tray having portions adapted in the inoperative position of said tray to cooperate with the oven and main body portion of said stove to form a completely enclosed cabinet, the pivotal connection between said tray and said stationary main body portion of said stove comprising a cylindrical sleeve fixed to said stove, a cylindrical sleeve fixed to said burner tray and supported on and extending into said first mentioned sleeve, and a pipe for supplying gas to said burner tray, said pipe comprising a section mounted in said stationary main body portion of said stove and a section extending through said first mentioned sleeve to said tray, and a rotary connection between said section permitting relative rotary movement thereof about the axes of said sleeves.

6. A cabinet cooking stove having an upright oven at one end thereof, a burner tray mounted on said stove to swing horizontally in a plane below said oven, said stove being provided beneath said oven with a recess adapted to receive a portion of said tray when the same is swung into inoperative position, said tray being provided with portions adapted in the inoperative position thereof to form portions of the cabinet.

7. A cabinet cooking stove having an upright oven at one end thereof, a burner tray mounted on said stove to swing horizontally in a plane below said oven, said stove being provided beneath said oven with a recess adapted to receive a portion of said tray when the same is swung into an inoperative position, said tray being provided with portions adapted in the inoperative position thereof to form portions of the top, front and one end of the cabinet.

8. A cabinet cooking stove having a burner tray mounted thereon to swing horizontally, said stove being provided with a recess adapted to receive a portion of said tray when the same is swung into an inoperative position, said tray being provided with portions adapted in the inoperative position thereof to form portions of the cabinet, one of said portions being adapted in the cooking position of said tray to form a splasher back therefor.

9. A cabinet cooking stove having a burner tray mounted thereon to swing horizontally, said stove being provided with a recess adapted to receive a portion of said tray when the same is swung into an inoperative position, said tray being provided with parts adapted in the inoperative position thereof to form portions of the top, front and one end of the cabinet, the part that forms a portion of one end of said cabinet in the inoperative position of said tray being adapted in the cooking position of said tray to serve as a splasher back therefor.

Signed at St. Louis, Missouri, this 30th day of January, 1932.

MAURICE G. KLEMME.